United States Patent [19]
Hassler et al.

[11] Patent Number: 5,583,729
[45] Date of Patent: Dec. 10, 1996

[54] TERMINAL BUSHING HAVING INTEGRAL OVERVOLTAGE AND OVERCURRENT PROTECTION

[75] Inventors: Stephen P. Hassler, Muskego; Gary L. Goedde, Racine; John Lapp, Franklin, all of Wis.

[73] Assignee: Cooper Industries, Inc., Houston, Tex.

[21] Appl. No.: 173,786

[22] Filed: Dec. 27, 1993

Related U.S. Application Data

[63] Continuation-in-part of Ser. No. 946,961, Sep. 17, 1992, Pat. No. 5,274,349, Ser. No. 67,512, May 24, 1993, Pat. No. 5,534,841, and Ser. No. 65,439, May 24, 1993, Pat. No. 5,355,111.

[51] Int. Cl.⁶ ........................................ H02H 7/04
[52] U.S. Cl. ................................ 361/39; 361/41
[58] Field of Search .......................... 361/39, 38, 132, 361/41; 337/31, 142, 158, 159

[56] References Cited

U.S. PATENT DOCUMENTS

| | | | |
|---|---|---|---|
| 2,668,210 | 2/1954 | Petersen | 361/39 |
| 3,437,971 | 4/1969 | Mikulecky | 337/158 |
| 3,611,240 | 10/1971 | Mikulecky | 337/178 |
| 3,774,137 | 11/1973 | Carothers | 337/174 |
| 3,825,871 | 7/1974 | Blewitt | 337/171 |
| 3,827,010 | 7/1974 | Cameron et al. | 337/168 |
| 3,863,187 | 1/1975 | Mahieu et al. | 337/162 |
| 3,913,050 | 10/1975 | Mikulecky | 337/159 |
| 3,990,031 | 11/1976 | Benton | 337/202 |
| 4,011,537 | 3/1977 | Jackson, Jr. et al. | 337/171 |
| 4,114,128 | 9/1978 | Cameron | 337/162 |
| 4,158,830 | 6/1979 | Biller et al. | 337/248 |
| 4,184,138 | 1/1980 | Beard et al. | 337/168 |
| 4,320,432 | 3/1982 | Duenke | 361/39 |
| 4,336,521 | 6/1982 | Kozacka et al. | 337/252 |
| 4,414,527 | 11/1983 | Biller | 337/180 |
| 4,481,495 | 11/1984 | Jarosz et al. | 337/159 |
| 4,506,249 | 3/1985 | Huber et al. | 337/232 |
| 4,540,968 | 9/1985 | Kato et al. | 337/31 |
| 4,542,363 | 9/1985 | Kato et al. | 337/31 |
| 4,570,146 | 2/1986 | Huber et al. | 337/158 |
| 4,625,196 | 11/1986 | Muench et al. | 337/212 |
| 4,743,996 | 5/1988 | Book | 361/39 |
| 4,930,039 | 5/1990 | Woodworth et al. | 361/127 |
| 5,113,306 | 5/1992 | Veverka et al. | 361/127 |
| 5,213,298 | 5/1993 | Johnson | 248/313 |

*Primary Examiner*—Jeffrey A. Gaffin
*Assistant Examiner*—Sally C. Medley
*Attorney, Agent, or Firm*—Conley, Rose & Tayon, P.C.

[57] ABSTRACT

A terminal bushing having integral overvoltage and fault current protection includes an insulator having an upper and a lower chamber. Nonlinear resistors are disposed in the upper chamber between a top terminal and an intermediate terminal which are mounted on the insulator. The top terminal, the nonlinear resistors and the intermediate terminal form a first current path through the bushing. The bushing also includes a pair of mounting arms which support a current limiting dropout fuseholder. The fuseholder is disposed in series between the top terminal and a bushing stud which is retained in the lower chamber of the bushing body. A second current path through the bushing is thus formed by the top terminal, the fuseholder and the bushing stud.

18 Claims, 4 Drawing Sheets

TERMINAL BUSHING HAVING INTEGRAL OVERVOLTAGE AND OVERCURRENT PROTECTION

This application is a continuation-in-part of the following U.S. patent application Ser. No. 07/946,961, filed Sep. 17, 1992 now U.S. Pat. No. 5,274,349; Ser. No. 08/067,512, filed May 24, 1993 now U.S. Pat. No. 5534,841; and Ser. No. 08/065,439, filed May 24, 1993 now U.S. Pat. No. 5,355,111.

FIELD OF THE INVENTION

The present invention relates generally to electrical power distribution equipment. More particularly, the invention relates to apparatus for protecting transformers and other electrical equipment from potentially damaging fault currents and overvoltages. Still more particularly, the invention relates to a terminal bushing for electrical equipment having integral overvoltage and overcurrent protection.

BACKGROUND OF THE INVENTION

Electrical transmission and distribution networks consist of a staggering number of transformers, circuit breakers, capacitor banks and a myriad of other types of equipment which all require some type of physical connection to the network. Such connections are made at the equipment terminals, which typically include a conducting rod or stud that extends through the equipment enclosure for interconnection to an energized conductor. The stud is generally encased by an insulative bushing which insulates the conducting stud from the equipment enclosure, typically a grounded metal tank which would otherwise provide an alternate current path to ground and thereby short-circuit the electrical equipment. The terminal bushing usually extends some distance beyond the equipment enclosure to ensure that the electrical connection between the end of the terminal stud and the energized conductor is far enough away from the grounded equipment enclosure that no flash over or arcing between the terminal and the equipment enclosure can occur.

Because transformers, capacitor banks and other electrical equipment are themselves very expensive to replace, and because a damaged or failed piece of equipment may cause costly and undesirable outages over a portion of the electrical network, such equipment must be protected from dangerous overvoltages and fault currents which could damage or destroy the equipment. Overvoltage protection schemes typically include providing surge arresters near the equipment. Surge arresters serve to divert the energy from an overvoltage-induced surge around the equipment safely to ground. Similarly, overcurrent or fault current protection is typically employed on the conductors which interconnect the transformer or other piece of equipment to the electrical network. A typical overcurrent protection scheme is to place a fuse in each phase of the conductors that service the equipment. Ideally, the surge arresters and fuses should both be positioned close to the equipment being served.

The installation of a transformer or other piece of electrical equipment and the associated protective devices described above can be extremely time consuming due to the many discrete elements which must be mounted and then interconnected by electrical conductors. For example, a common form of transformer is a pole-mounted distribution transformer consisting of a can-like tank which is mounted on a utility pole, either on a specially built platform or directly to the pole itself. Although some transformers include surge arresters already mounted either internally or externally on the transformer tank, many applications require that the surge arrester be mounted separately. In these instances, the arrester is mounted on the utility pole, or on the pole's crossarms (when available), by means of special brackets and fasteners. Likewise, the fuses must also be mounted with their own particularly-designed hardware and mounting brackets. Complicating the installation even further is the fact that crossarmless utility poles are becoming more and more prevalent. This has necessitated that the equipment manufacturers design and produce additional mounting hardware for each component. Likewise, the utilities must purchase and have an inventory of these additional brackets and other hardware.

Once mounted, these components must still be interconnected by various electrical conductors that are strung between the transformer terminal bushing and the fuses and surge arresters. Each arrester and each fuse generally includes two terminals which must be interconnected. As is apparent, even under the best of conditions, mounting and interconnecting these various components may be quite time consuming. During adverse conditions, such as when replacing equipment during a winter storm - an instance when quickly restoring power to utility customers is critical—having to locate, position, install and then interconnect several discrete elements using a number of different types of mounting brackets and hardware is a disadvantage. This time-consuming process may also prove hazardous for the service personnel who are typically working high above the ground and who may be exposed to dangerous weather-related elements throughout this installation period.

Aside from the inconvenience, delay and costs associated with having to install a number of discrete components when placing electrical equipment in service, certain deficiencies presently exist with respect to conventional protection schemes for transformers and other equipment. A common fuse employed to protect transformers, capacitors and other such equipment is the expulsion fuse. An expulsion fuse includes a fuse link that is retained within a tubular enclosure that is lined with an organic material. The fuse link includes a relative short length of a fusible element. When an overcurrent of a predetermined magnitude flows through the fuse, the fusible element in the fuse link melts and an arc is formed across the melted element. Interruption of the overcurrent takes place by the deionizing and explosive action of the gases which are liberated when the liner of the tubular enclosure is exposed to the heat of the arc. The operation of the expulsion-type fuse is characterized by a loud noise and violent emission of gases, flame and burning debris, all of which pose a danger to personnel, the equipment the fuse is designed to protect as well as other nearby equipment or structures. Because of these operating characteristics, expulsion fuses must be mounted well away from the electrical equipment and form other components.

Another inherent disadvantage of the expulsion-type fuse is that it requires from one-half to one full cycle of current before the fuse clears a high current fault. During this time, the equipment the fuse is intended to protect must endure the full available fault current that is allowed to pass through the fuse to the equipment. Potentially damaging energy that will be dissipated in the equipment will be proportional to the formula $I^2T$, where I is the magnitude of the overcurrent and T is the time that the current condition exists.

Other disadvantages to the use of expulsion-type fuses exist. For example, the high current that is conducted through the expulsion fuse prior to interruption tends to cause bothersome voltage dips elsewhere in the network, causing lights to flicker and sensitive computers and other electronic equipment to suffer. Further, expulsion fuses may not clear the overcurrent condition soon enough to prevent sectionalizing fuses, reclosers, or other protective relays and circuit devices from also sensing the overcurrent and responding by temporarily, and sometimes permanently, disconnecting other portions of the network.

The violent operating characteristics of the expulsion fuse also have a compromising effect on the overvoltage protection that can be provided. Because of its violent operation, an expulsion fuse must be placed some distance away from the protected equipment. The surge arrester is generally located "upstream," or on the source side of the over current protection device to prevent arrester discharge currents from having to pass through the overcurrent protective device as the currents flow to ground. Having these currents pass through the over current protective device can cause nuisance fuse blowings. However, locating the arrester on the upstream side of an expulsion fuse requires long lead lengths be used to connect the arrester into the system. The voltage drop across the long leads adds to the discharge voltage of the arrester. The voltage that results across the insulation of the protected equipment is equal to the total of these two voltages.

As is apparent, then, despite the many improvements made in protective schemes and in fuse and surge arrester technology, further advances would be welcomed by the industry. Specifically, there is a need for apparatus that would enable surge arresters and fuses both to be positioned close to the terminals of the equipment they are designed to protect. Also, an invention which would integrate the protected equipment with the protective components themselves would be ideal, as it would eliminate many of the interconnections which must be made by field personnel, many times during storms or other adverse conditions. It would be further desirable if the invention would do away with the many and varied insulators, mounting brackets, fasteners and other associated hardware which now must be employed with each protective device.

SUMMARY OF THE INVENTION

Accordingly, there is provided a terminal bushing having integral overvoltage protection and overcurrent protection. The bushing includes an insulative body and a bushing stud extending from the insulative body for interconnection with a transformer or other electrical apparatus. A line terminal is included on the insulative body and a plurality of surge arresting elements, such as nonlinear resistors, are disposed in the body to provide overvoltage protection. A stud or other electrical conductor is connected in series with the nonlinear resistors and extends outside of the insulative body forming an intermediate terminal suitable for connection to a ground lead. The terminal bushing thus includes a first current path from the line terminal to the intermediate terminal through the nonlinear resistors.

The invention further includes a fuseholder supported from the insulative body and electrically interconnected between the line terminal and the bushing stud. In this arrangement, the fuseholder forms a portion of a second current path and provides overcurrent protection for the connected electrical equipment. The fuseholder may be a current limiting fuseholder and thus may be located in close proximity to the equipment it is designed to protect. Furthermore, the fuseholder may be a dropout style fuseholder such that, upon actuation, the fuseholder will drop open so as to provide a clear and unmistakable visual indication that the fuse has actuated.

During normal steady-state conditions, current is conducted through the second current path, i.e., from the line terminal to the bushing stud via the fuseholder. When an overcurrent of a predetermined magnitude and duration is conducted through the fuseholder along this current path, the fusible elements will fuse open and thereby stop the flow of potentially damaging current from being conducted through the protected equipment. When a transient overvoltage condition occurs, such as may result from lightning strikes or switching surges, the surge arresting elements will become conductive. When this occurs, the overvoltage-induced current surges will bypass the current path through the fuseholder and be directed to ground through the first current path.

The invention permits a transformer or other piece of equipment to be manufactured with the surge arresters and fuses already installed, saving the significant costs associated with manufacturing and shipping several discrete components and their associated mounting hardware. Additionally, significant savings in time and effort are provided to the field personnel since by using the invention, only one, rather than three or more, components need to be installed. Also, the invention eliminates many of the various interconnections among discrete components. For example, using the invention with a single phase transformer, only two terminals need to be connected (excluding transformer secondary connections). The invention has the additional advantage that the surge arrester is not connected downstream of the overcurrent device, insuring that nuisance fuse blowings caused by the operation of the surge arrester does not occur. The invention may also be mounted on crossarmless utility poles which are all the more frequently being employed by utilities. The lack of crossarms in the past made installation of surge arresters and fuses more difficult, and has required that utility personnel keep even a greater number of brackets, supports and mounting hardware on hand for use in installation. The invention also positions the surge arrester in the ideal position immediately adjacent the equipment it is protecting, thereby optimizing the arrester location. The employment of the current-limiting dropout fuseholder provides quite, explosionless and nonviolent overcurrent protection, and permits the fuse to be mounted close to the equipment that is to be protected.

BRIEF DESCRIPTION OF THE DRAWINGS

For a detailed description of a preferred embodiment of the invention, reference will now be made to the accompanying drawings wherein.

DESCRIPTION OF THE PREFERRED EMBODIMENT

A variety of types of electrical equipment must be interconnected to transmission and distribution networks in order to properly serve the power needs of today's industrial, commercial and residential users. The interconnections of such equipment to the network are made at the equipment terminal bushings. The present invention relates to a terminal bushing having integral overvoltage and over current protection, and may be applied to all of the various types of electrical equipment. Accordingly, for purposes of example only, and not by way of limiting the present invention in any way, the invention will be described with reference to its use on a pole-mounted distribution transformer, it being understood that the invention may also be employed with capacitor banks, switching apparatus, reactors, and other types of transformers, motors and other electrical equipment.

Figure 1:
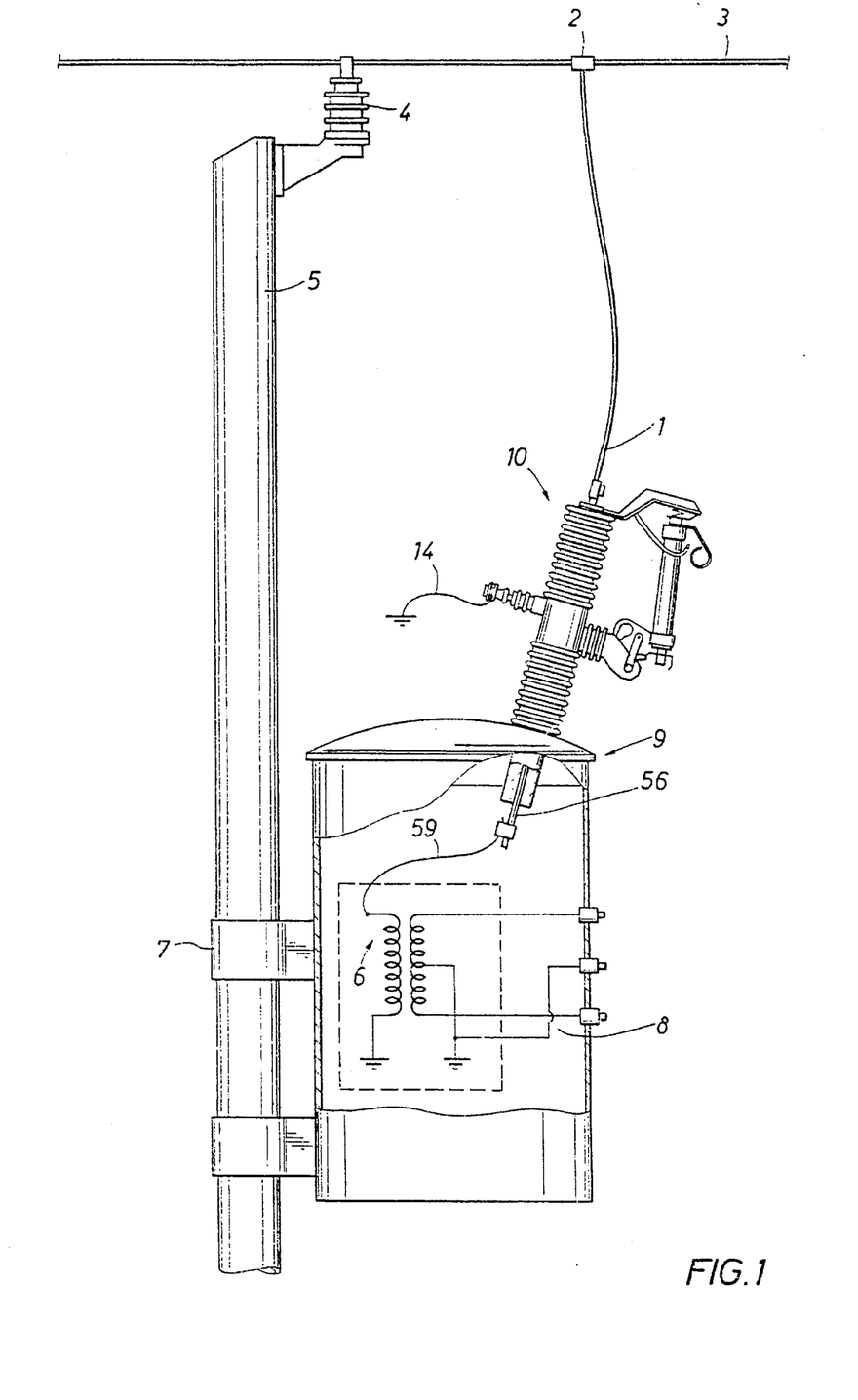
FIG. 1 is an elevational view showing the terminal bushing assembly of the present invention employed on a pole-mounted transformer, a portion of the transformer enclosure shown cut away so as to schematically illustrate the transformer winding and internal connections.

Referring to the drawings, FIG. 1 shows the terminal bushing assembly 10 of the present invention mounted on a distribution transformer 9 which, in turn, is supported on a crossarmless power pole 5 by mounting brackets 7. Transformer 9 generally comprises tank 8 which encloses an immersed winding 6, winding 6 being shown schematically in FIG. 1. An electrical insulator 4 is mounted on power pole 5 and supports power distribution conductor 3 which is strung pole-to-pole. Line potential conductor 1 is attached to conductor 3 by connector 2 and electrically interconnects transformer 9 to distribution conductor 3 via bushing assembly 10.

Figure 2:
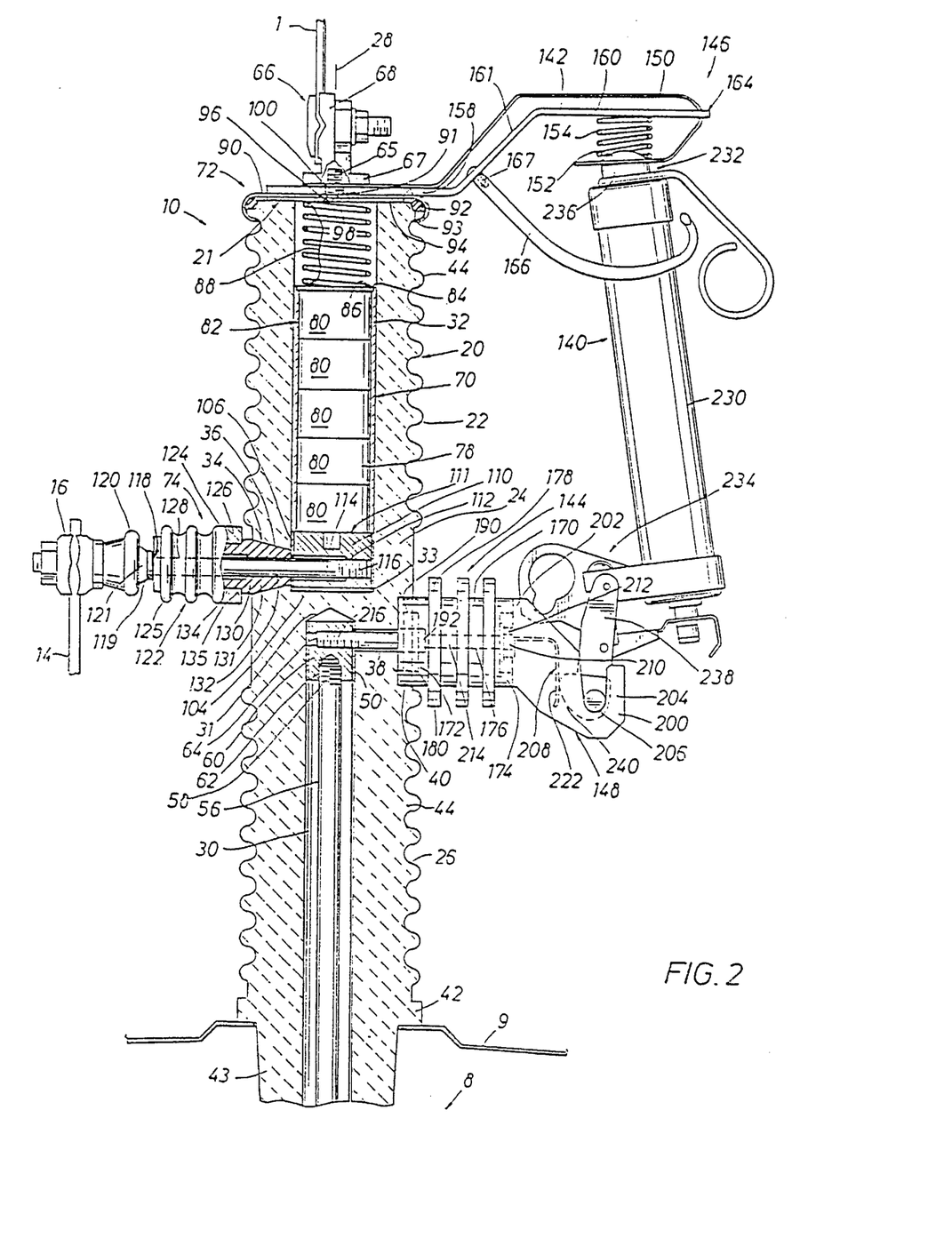
FIG. 2 is an elevational view, partly in cross-section, of the terminal bushing shown in FIG. 1.

Referring now to FIG. 2, terminal bushing assembly, 10 generally includes bushing body 20, bushing terminal 66, surge arrester 70, and fuseholder 140.

Bushing body 20 is a generally cylindrical insulator having central longitudinal axis 28. Bushing body 20 is made of porcelain or other insulative material. In the preferred embodiment, body 20 includes integrally formed upper portion 22, central portion 24 and lower portion 26. Spaced-apart ribs 44 are formed about the outer surface of upper portion 22 and lower portion 26 so as to increase the creepage distance along the surface of bushing body 20. Lower portion 26 includes base 42, for attaching bushing body 20 to transformer 9, and a frustoconical extension 43 which extends into transformer tank 8. Lower portion 26 also includes lower longitudinal bore 30 which extends into central portion 24 and terminates at end 31. Similarly, an upper longitudinal bore 32 is formed through upper portion 22 and into central portion 24 of body 20, terminating at floor 33. Longitudinal bores 30 and 32 are formed coaxially with axis 28 but do not intersect. A groove 93 is formed along the periphery of the top surface 21 of upper body portion 22.

Central portion 24 of bushing body 20 includes an upper radial bore 34 formed so as to intersect the upper longitudinal bore 32 near floor 33. Upper radial bore 34 includes inwardly tapered sides 36. A lower radial bore 38 is formed in central portion 24 of bushing body 20 at a position approximately 180° away from upper radial bore 34. Lower radial bore 38 intersects lower longitudinal bore 30 near end 31. A counterbore 40 is formed in bushing body 20 coaxially with lower radial bore 38.

Referring still to FIG. 2, bushing assembly 10 further includes bushing stud 56 and terminal member 60. Terminal 60 is disposed in lower longitudinal bore 30 adjacent end 31. Terminal 60 is a generally cylindrical member formed of copper or other conducting material and includes a threaded longitudinal bore 62 coaxially aligned with bushing axis 28. Terminal 60 further includes a radial bore 64 that, upon assembly of bushing 10, is aligned with lower radial bore 38 of bushing body 20. Terminal 60 is covered with a pliant rubber sleeve 50 to help distribute the radial forces imparted by bolt 192 to the wall of bore 30 in lower portion 26 of bushing body 20.

Referring now to both FIGS. 1 and 2, transformer bushing stud 56 is disposed in lower bore 30 of bushing body 20. Bushing stud 56 is preferably made of copper. The upper end 58 of stud 56 threadedly engages terminal 60 in longitudinal bore 62. Bushing stud 56 extends into transformer tank 8 from bushing assembly 10 and is connected to transformer winding 6 by conducting lead 59 (FIG. 1).

As explained more fully below, terminal 66 of bushing assembly 10 is attached to upper portion 22 of bushing body 20 and provides a means for electrically interconnecting bushing assembly 10 with line-potential conductor 1. Bushing terminal 66 is made of brass or of another electrically conducting material. As best shown in FIG. 2, terminal 66 generally includes base 67 and clamping portion 68 integrally formed on base 67. Base 67 includes a central threaded bore 65.

Referring still to FIG. 2, surge arrester 70 generally includes upper terminal assembly 72, lower terminal assembly 74, and a plurality of surge arresting elements 78 disposed in series in upper longitudinal bore 32 between upper and lower terminal assemblies 72, 74 respectively. Surge arresting elements 78 may include nonlinear resistors, spark gap assemblies or a combination of such elements. In the preferred embodiment shown in FIG. 2, surge arresting elements 78 are metal oxide varistors (MOVs) 80.

Lower terminal assembly 74 of arrester 70 generally comprises conductive insert 110, stud 114, isolator 120, insulator body 122 and frustoconical seal 130. Conductive insert 110 generally comprises a cylindrical block formed of aluminum or other conductive material having a flat upper surface 111 and an internally threaded radial bore 112. The outer cylindrical surface of insert 110 is covered with a pliant rubber sleeve 106. Insert 110 is positioned in upper longitudinal bore 32 adjacent to floor 33 and held in place by tightening stud 114, described below. In addition, urethane potting compound 104 is disposed between insert 110 and floor 33 and is used to support cantilevered insert 110, such that radial bore 112 is coaxially aligned with upper radial bore 34 of bushing body 20.

Stud 114 includes threaded end 116, and flat end 118 that is connected to isolator 120 as described below. Preferably stud 114 is made of stainless steel or other conductive material. Threaded end 116 of stud 114 is disposed through upper radial bore 34 of bushing body 20 and threadingly engages radial bore 112 of conductive insert 110. So positioned, end 118 of stud 114 extends outside of bushing body 20 at an angle substantially perpendicular to bushing axis 28.

As shown in FIG. 2, frustoconical seal 130 includes nose portion 131 and an annular extension 134 attached to nose portion 131 at shoulder 135. Seal 130 is preferably made of Buna N rubber and includes a central longitudinal bore 132 formed through nose 131 and through annular extension 134. Seal 130 is disposed in upper radial bore 34 with stud 114 disposed through bore 132. Nose portion 131 of seal 130 is positioned adjacent to insert 110 with the tapered portion of nose 131 disposed against tapered sides 36 of radial bore 34. Annular extension 134 and shoulder 135 extend outside of bushing body 20.

Insulator body 122 is formed of porcelain or other insulative material and generally includes a base 124 and a fibbed extension 125. Body 122 further includes a central bore 128 coaxially aligned with bore 132 of seal 130. A counterbore 126 is formed in base 124. Upon assembly of bushing assembly 10, insulator body 122 is disposed about stud 114 with base 124 abutting shoulder 135 of seal 130, such that counterbore 126 receives annular extension 134 of seal 130.

Referring still to FIG. 2, connected to stud 114 is arrester isolator 120. Isolator 120 includes a metallic base section 121 having end 119 which is welded to flat end 118 of stud 114. Isolator 120 is a conventional ground lead disconnecter that is provided to physically disconnect the ground wire 14 from lower terminal assembly 74 of arrester 70 should the isolator reach a predetermined temperature. Isolator 120 employs an internal explosive charge (not shown) to disconnect the ground lead. Ignition of the explosive charge may occur, for example, when the arrester has operated to dissipate a surge current to ground but has failed to "turn off" and is thus functioning as a relatively high impedance fault to ground for the steady-state power frequency current after a transient-induced surge has dissipated.

As mentioned above, stacked atop tipper surface 111 of conductive insert 110 are a plurality of surge arresting elements 78 which, in the preferred embodiment, are MOVs 80. MOVs 80 are formed in short cylindrical disks having a diameter slightly less than the inside diameter of upper longitudinal bore 32. MOVs 80 are stacked in columnar fashion to form a series path for surge current through column 82 of MOVs 80. A conductive plate 84 is disposed atop column 82 of MOVs 80. As shown in FIG. 2, a compression spring 86 is disposed between, and in electrical contact with, plate 84 and upper terminal assembly 72. Plate 84 and spring 86 cooperate to provide an axial load against the MOV column 82 to maintain the varistor elements 80 in contact with one another, as is necessary for good electrical contact and for the arrester 70 to function properly. A shunt conductor 88, such as a flexible strap of braided copper or aluminum, is disposed between the ends of spring 86 so as to ensure that a good conductive path exists between upper terminal assembly 72 and MOV column 82.

Upper terminal assembly 72 of arrester 70 generally comprises end cap 90, reinforcing plate 94, O-ring seal 92 and a conductive fastener, such as stud 98 welded to end cap 90. Reinforcing plate 94, preferably made of hot rolled steel, is disposed over the top surface 21 of bushing body 20 to reinforce end cap 90 which forms a closure for upper longitudinal bore 32. Cap 90 is preferably made of stainless steel. Conductive stud 98 includes threaded shank 100 and is positioned in the center of end cap 90. Cap 90 is supported atop and spot welded to reinforcing plate 94. 0-ring seal 92 disposed in groove 93 of top surface 21 beneath cap 90. Upon assembly of bushing terminal assembly 10, the edges of cap 90 are compressed and deformed around upper surface 21 so as to retain cap 90 on bushing body 20 and to compress seal 92 therebetween. So assembled, a first current path through said bushing body 20 is formed and comprises terminal 66, bolt 98, plates 84,94, shunt conductor 88, MOV column 82, conductive insert 110, stud 114 and isolator 120.

Overcurrent protection for transformer 9 is supplied by fuseholder 140 described in more detail below. Referring still to FIG. 2, fuseholder 140 is supported by upper support member 142 and lower support member 144 which are attached to and extend from bushing body 20. Upper support member 142 comprises a base portion 158 for attachment to bushing body 20, an extending portion 160 and an intermediate portion 161 joining portions 158 and 160.

Preferably, upper support member 142 is made of galvanized hot rolled steel and is attached to bushing body 20 by conductive bolt 98. Base section 158 includes an aperture 162 aligned with bushing body axis 28. Aperture 162 is disposed about threaded shank 100 of stud 98 such that base 158 is in contact with cap 190. Extending portion 160 includes a recess 164 in its outermost end and supports the upper fuse terminal 146 of fuseholder 140 as described below.

Upper fuse terminal 146 generally comprises conducting strap 150, spring 154 and a cup electrode 152 which is integrally formed in conducting strap 150. Conducting strap 150 electrically interconnects cup electrode 152 and terminal 66 on bushing body 20. Strap 150 includes an aperture 156 which is disposed about threaded shank 100 of stud 98 such that stud 98 and terminal 66, when fastened together, secure conducting strap 150 and upper support member 142 to bushing body 20. Conducting strap 150 is disposed in recess 164 in extending portion 160 of upper support member 142. Coil spring 154 is disposed between upper support member 142 and cup electrode 152 to allow some reciprocal movement of cup electrode 152 with respect to support member 142. A pair of load break guide arms 166 (one shown in FIG. 2) are mounted on intermediate portion 161 of upper support member 142 by rivets 167 or other suitable fasteners. Guide arms 166 serve to guide fuseholder 140 into position within upper fuse terminal 146 and to provide hooks for attaching an industry-standard load current interrupting tool.

Lower support member 144, best shown in FIG. 2, generally comprises an insulator body 170 and a lower current interchange spring 208 attached to insulator body 170 by fastener 210. Insulator body 170 is preferably made of a plastic material such as nylon or a thermoplastic polyester and includes a base end 172, a connective end 174, and a central longitudinal bore 176. Ribs 178 are disposed about the outer surface of insulator body 170. Base end 172 includes a recess 180 formed coaxially with bore 176. An annular seal 190 having an annular extension 192 is disposed within base end 172 in recess 180. Preferably, seal 190 is made of rubber.

Spring 208 is preferably made of phosphor bronze and includes a mounting hole formed in one end and a pair of spring arms 222. Connective end 174 of insulator body 170 includes a pair of hanger arms 204 integrally formed on body 170. Hanger arms 204 include elbows 206 for supporting the lower end of fuseholder 140. In the preferred embodiment, fastener 210 comprises a bolt made of a copper alloy or other conducting material and includes head 212 and shank 214 having a threaded end 216.

Upon assembly of lower support member 144, seal 190 is positioned in recess 180 of base end 172 of insulator body 170. Base end 172 is disposed in counterbore 40 of bushing body 20 with bore 176 in insulator 170 coaxially aligned with lower radial bore 38 of bushing body 20. Current interchange spring 208 is disposed against base 172 of insulator 170 with aperture 209 aligned with bore 176 of insulator 170. Bolt 210 is disposed through aperture 209 of spring 208, and through bore 176 of insulator body 170 and into lower radial bore 38. The threaded end 216 of bolt 210 threadingly engages the threaded radial bore 64 in terminal 60.

In the preferred embodiment, fuseholder 140 comprises a full range, current limiting dropout fuseholder, such as that described and claimed in co-pending U.S. patent application, Ser. No. 07/946,961, filed Sep. 17, 1992, the entire disclosure of which is incorporated herein by reference. That application discloses a new and unique current limiting fuse and dropout fuseholder which possesses many significant advantages over prior art fuses and fuseholders, such as, for example, by providing a full range of current interruption without the hazards and nuisances associated with prior-art expulsion fuses. Further, the fuse and fuseholder of Ser. No. 07/946,961 may be made much smaller and more compact than even prior art current limiting fuses, enabling the fuseholder to be employed in locations having relatively small mounting spaces or clearances.

Referring still to FIG. 2, fuseholder 140 generally comprises fuse body 230 having upper cap assembly 232 and lower cap and hinge assembly 234. Upper cap assembly 232 includes a top contact 236. Lower cap and hinge assembly 234 includes a conducting hinge member 238 which, as described below, is electrically interconnected through fuse body 230 with top contact 236. Top contact 236 is disposed within the recess of cup electrode 152, and hinge member 238 is engaged by hanger arms 204 of lower terminal assembly 148. Spring arms 222 are biased against camming surfaces 240 of hinge member 238 of the lower cap and hinge assembly 234 to ensure good electrical contact between the hinge assembly 234 and mounting hinge 200.

Figure 3:
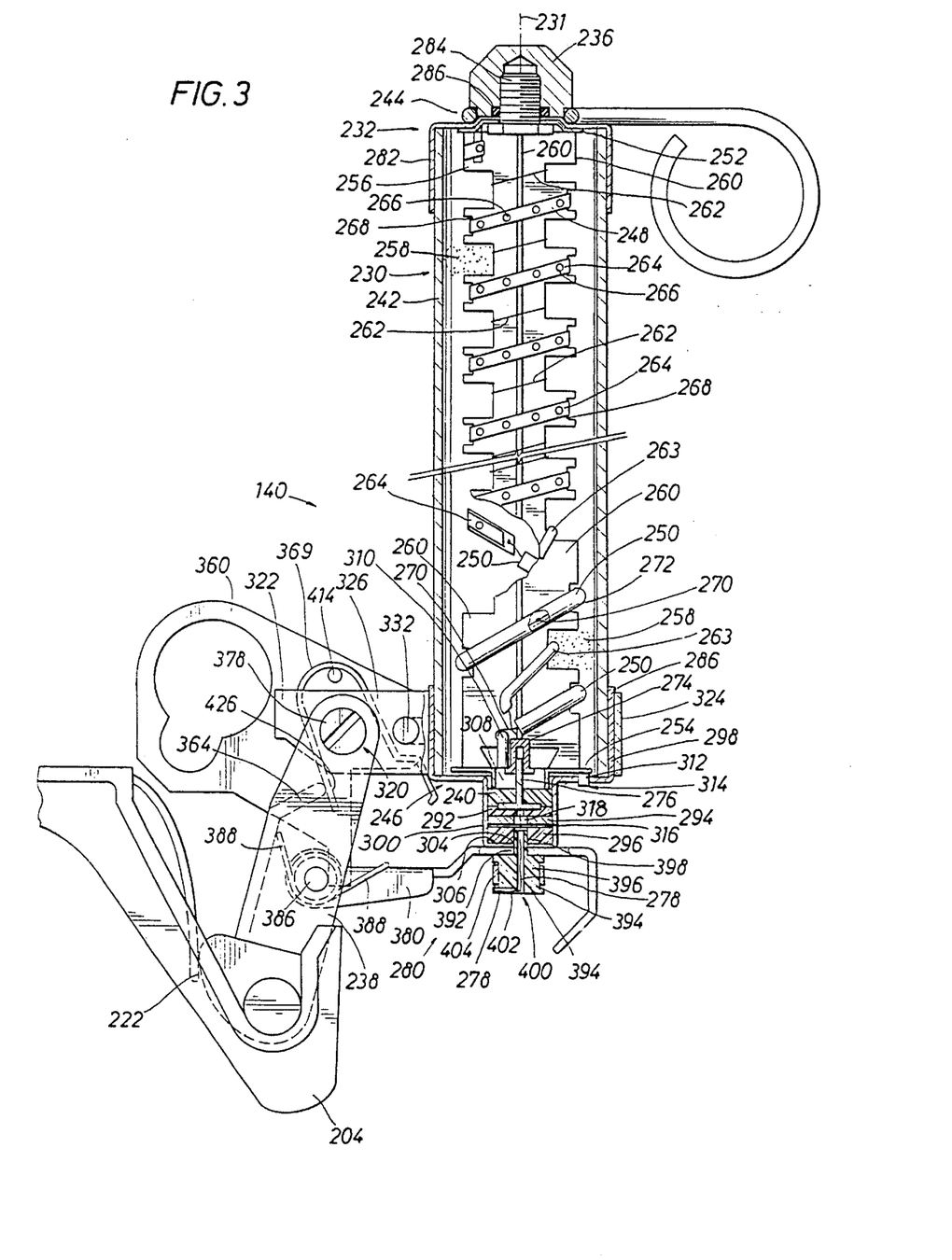
FIG. 3 is a side elevational view, partly in cross section, of the current limiting fuseholder of the terminal bushing assembly shown in FIG. 1.

Referring now to FIG. 3, fuse body 230 includes an insulative fuse tube 242 disposed about longitudinal axis 231 and closed at its ends by upper and lower closures 244, 246, respectively. A high current fusible element 248 and a low current fusible element 250 are housed in fuse tube 242 and are connected in series between upper and lower element terminations 252, 254 respectively. Fuse body 230 houses an insulative spider 256 which supports fusible elements 248 and 250. High purity silica sand 258 surrounds spider 256 and fusible elements 248, 250 and fills the unused volume within fuse body 230. Spider 256 includes four arms 260 radiating from the longitudinal axis 231, three of arms 260 being visible in FIG. 3.

Upper and lower element terminations 252, 254 are formed of a conducting material, preferably copper, and serve as supports for arms 260 of spider 256 and as landings and termination points for fusible elements 248, 250 and for the upper end of auxiliary wire 262, as described below.

High current fusible element 248 comprises a ribbon element 264 made of silver or other electrically conducting material. Ribbon element 264 includes an array of reduced area portions 266 which comprise holes that are formed through the thickness of ribbon 264. Ribbon 264, with its reduced area portions 266, is helically wound on the element support surfaces 268 of spider arms 260.

Referring still to FIG. 3, connected in series with high current fusible element 248 is low current fusible element 250 which is designed to operate at a predetermined current level below that level at which high current fusible element 248 is designed to operate. Depending on the current rating of the fuseholder 140, low current fusible element 250 comprises one or more parallel connected conducting wires 270 (one shown in FIG. 3), which are preferably formed of silver or other good electrically conductive material and insulated in a silicone rubber covering 272. The covered wire 270 is then helically wrapped about the lower section of spider 256. The lower end of wire 270 is soldered to lower element termination 254.

Also disposed within fuse body 230 is auxiliary wire 262 which preferably is formed of silver for higher current rated fuses or a conductor of higher resistivity such as nichrome for lower current rated fuses. Auxiliary wire 262 is helically wound about spider 256 so as to be concentrically disposed within the helix formed by ribbon 264 and wire 270. The lower segment 63 of auxiliary wire 262 is insulated in a silicone rubber covering as it enters the space occupied by the helix formed by low current fusible element 250. The upper end of auxiliary wire 262 is soldered to upper element termination 252. The lower segment 263 of auxiliary wire 62 terminates on flanged receptacle 274 which is made of brass or other conducting material and retained in a central recess formed along fuse axis 231 in the lower end of spider 256. A conducting insert 276, preferably made of brass, is inserted into receptacle 274 and is brazed or soldered to a trigger wire 278 which preferably is made of high strength and high electrical resistance nichrome. Trigger wire 278 forms a part of latching apparatus 280 and extends outside of fuse body 230 through lower closure 246. Conducting receptacle 274, insert 276, trigger wire 278 and auxiliary wire 262 are all electrically insulated from lower closure 246.

Upper cap assembly 232 generally comprises top contact 236, top end cap 282 and upper element termination 252, all of which are formed of conducting materials and are fastened together by stud 284. An O-ring seal 286 is disposed about stud 284 between top contact 236 and end cap 282. Stud 284 includes a central longitudinal bore (not shown) to permit filling of fuse tube 242 with sand 258 upon assembly of fuseholder 140.

Lower closure 246 generally comprises bottom end cap 286, lower element termination 254, seal member 290, positioner 292, conductive washer 294 and insulative spacer 296. Bottom end cap 286 is preferably formed of copper alloy and generally includes a cylindrical body portion 298 disposed about fuse tube 242, and a reduced diameter extension 300 having an interior recess. Extension 300 and body 298 are generally coaxially aligned with fuse axis 231. An aperture 304 is formed substantially in the center of lower surface 306 of extension 300 at the intersection with axis 231.

Lower element termination 254 includes central aperture 308 which is substantially aligned with fuse axis 231, and further includes conducting tab 310 which serves as a landing and termination point for low current fusible element 250. Lower element termination 254 further includes tab 312 which is disposed through hole 314 and soldered to cap 286.

Coaxially disposed within the central recess of extension 300 are insulative spacer 296, conductive washer 294, wire positioner 292 and seal member 290. Seal member 290 comprises a rubber washer having central aperture. Wire positioner 292 comprises an insulative washer made of mica or nylon or other insulating material and also includes central aperture. Conductive washer 294 is made of a conducting material such as brass and includes a central aperture and an outer edge surface 316 which engages the walls of extension 300 so as to create a current path therethrough. Insulative spacer 296, which may be made of rubber or nylon, for example, also includes a central aperture.

Receptacle 274, is disposed through central hole 308 in lower element termination 254 and is retained in the lower end of spider 256. Conducting insert 276 is inserted into conducting receptacle 274 through hole 308 of lower element termination 254 during assembly of fuse body 230 with trigger wire 278 extending out of fuse body 230 through aperture 304 in end cap 286, passing through the apertures of spacer 296, conducting washer 294, positioner 292, and seal 290. A spark gap 318, which preferably is approximately 0.040 inches for all voltage and current ratings for fuseholder 140, is thus formed between trigger wire 278 and washer 294.

Figure 4:
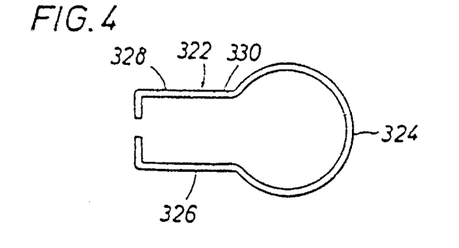
FIG. 4 is a top view of the connective member of the lower cap and hinge assembly of the fuseholder shown in FIG. 3.

Lower cap and hinge assembly 234 of fuseholder 140 generally includes latching apparatus 280, hinge member 238, sleeve 320 and connective member 322. Referring to FIGS. and 4, connective member 322 includes a clamping strap portion 324 and a pair of hinge supporting members 326 attached thereto (one visible in FIG. 3). Two pairs of aligned holes 28, 330 are formed in hinge supporting members 326. Fastener 332 is disposed through aligned holes 330 in order to draw together hinge supporting members 326 and to secure clamping strap portion 324 about bottom end cap 286.

Figures 5, 6, 8, 9, 10, 11:
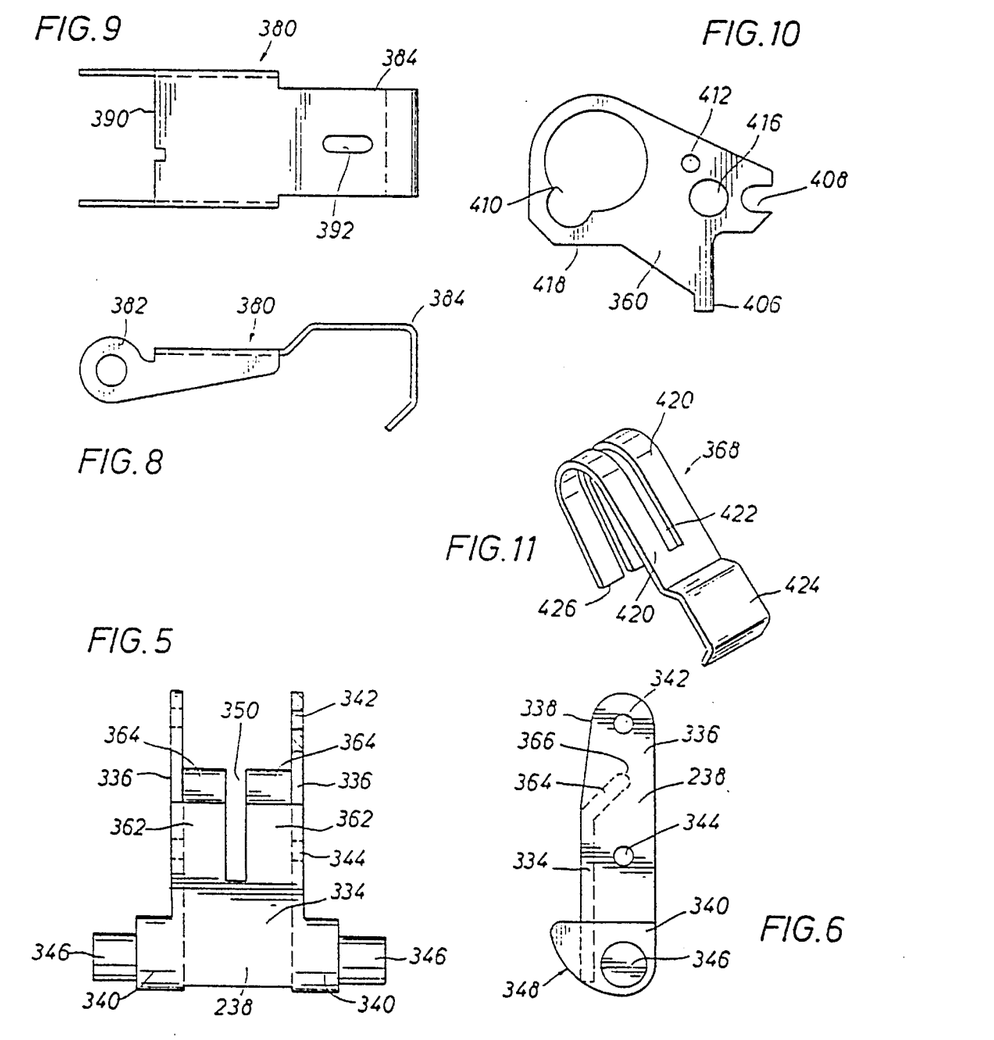
FIG. 5 is a top view of the hinge member of the lower cap and hinge assembly of the fuseholder shown in FIG. 3.
FIG. 6 is a side elevational view of the hinge member shown in FIG. 5.
FIG. 8 is a side view of the latch member of the lower cap and hinge assembly of the fuseholder shown in FIG. 3.
FIG. 9 is a top view of the latch member shown in FIG. 8.
FIG. 10 is a side elevational view of the latch plate member of the lower cap and hinge assembly of the fuseholder shown in FIG. 3.
FIG. 11 is a perspective view of the current interchange of the lower cap and hinge assembly of the fuseholder shown in FIG. 3.

Referring to FIGS. 3, 5 and 6, hinge member 238 generally comprises base portion 334 disposed between a pair of outwardly extending side members 336. Side members 336 include tapered edge 338, shoulder 340 and two pairs of aligned holes 342,344. Holes 342 are formed through side members 336 adjacent tapered edge 338. Shoulder portions 340 have trunions 346 extending outwardly therefrom and include cam-like electrical contact surfaces 348 adapted for electrical engagement with conducting spring arms 222 of mounting hinge 200. Holes 344 are formed in side members 336 between holes 342 and shoulders 340. Base 334 includes a central slot 350 for receiving latch plate 360. Slot 350 generally bisects base 334 forming a pair of leg portions 362. Legs 362 include ends 364 which extend outwardly from base 334 at an angle which is substantially equal to 45° and form a shoulder 366 which engages and supports one end of the current interchange 368.

Figure 7:
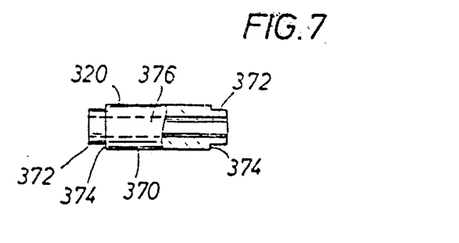
FIG. 7 is a side elevational view, partly in cross-section, of the sleeve for the lower cap and hinge assembly of the fuseholder shown in FIG. 3.

Lower cap and hinge assembly 234 further includes sleeve 320 (FIG. 7) generally comprising a cylindrical body 370 having reduced diameter portions 372 at each end, forming shoulders 374. A central bore 376 is longitudinally formed through sleeve 320. Reduced diameter portions 372 are disposed in holes 328 of hinge supporting members 326 of connective member 322 such that members 326 abut shoulders 374. Sleeve 320 provides a spacing means to maintain the proper separation between hinge supporting members 326 and provides a bearing means for a pin 378, which is disposed through central bore 376 and which supports hinge member 238.

Referring now to FIGS. 3, 8 and 9, latching apparatus 280 includes, in addition to spark gap 318 and trigger wire 278, latch 380, spring 388 and latch plate 360. Latch 380 generally comprises a fixed end 382 and a rotatable fuse retaining end 384. Pin 386 (FIG. 3) is disposed through fixed end 382 such that latch 380 is rotatably mounted about pin 386. Spring 388 is also mounted around pin 386 to bias latch 380 in a clockwise direction as viewed in FIG. 3. Latch 380 includes latching surface 390. Fuse retaining end 384 includes elongate or slotted aperture 392. Latch member 380 is preferably made of stainless steel, although any conductive or insulative material having sufficient rigidity and strength may be employed.

Referring again to FIG. 3, latching apparatus 280 further includes a bobbin 394. Bobbin 394 is made of nylon or other insulative material and generally comprises a spool-shaped body 396 and an annular extension 398. A central aperture 400 is formed through body 396 and extension 398. Upon assembly of fuseholder 140, fuse retaining end 384 of latch 380 is rotated into a latched or supporting position against extension 300 of bottom end cap 286 such that aperture 392 is aligned with fuse axis 231. Latch surface 406 on latch plate 360 engages latching surfaces 390 of latch 380. Annular extension 398 of bobbin 394 is disposed through aperture 392 in latch 380 and the end of trigger wire 278 extending from fuseholder 140 is disposed through central bore 400 of bobbin 394. Trigger wire 278 is then bent and pressed into radial groove 402 formed in lower surface of spool body 396 and held in place against the sides of body 396 by clamping band 404. When so attached, latch plate 360, latch 380 and trigger wire 278 retain hinge member 238 and connective member 322 in fixed angular relationship to one another in a "contracted" and "charged" position, and prevent rotation about the joint means, i.e. pin 378 and sleeve 320. Latch plate 360 is provided to prevent forces such as those exerted by spring 388, current interchange 368, spring arms 222, mounting cup electrode 152, as well as external forces which may come to be applied to fuseholder 140 during handling, transportation, installation, from breaking the connection between trigger wire 278 and latch 380 or from severing wire 278.

Latch plate 360, best shown in FIG. 10, is a generally flat metal plate having a projecting latch surface 406 for engaging latching surface 390 of latch 380 to help maintain retaining end 384 of latch 380 in its latched and supporting position beneath bottom end cap 286 until actuation of fusible elements 248, 250. Latch plate 360 further includes a notch 408 for receiving fastener 332 of connective member 322, a key way 410 for use in installing and removing fuseholder 140 by "hot stick," and an aperture 412 for receiving pin 414 (FIG. 3). Latch plate 360 further includes aperture 416 for receiving sleeve 320 which is disposed through holes 328 of hinge supporting member 326. Pin 378 is disposed through central bore 376 of sleeve 320 and through holes 342 of hinge member 238. Latch plate 360 is received in slot 350 of hinge member 238 and includes a stop shoulder 418 for limiting its rotation on pin 378 through engagement with pin 386. The rotatable mounting of connective member 322 and latch plate 360 about sleeve 320, together with the inter-engagement of the fastener 332 within the notch 408 cause latch plate 360 to be non-rotatably anchored to connective member 322. This connection means causes latch plate 360 and connective member 322 to always rotate as a single unit along with fuse body 230 about the joint means, i.e. pin 378 and sleeve 320.

As shown in FIGS. 3 and 11, current interchange 368 provides a good conductive path between lower end cap 286 and hinge 238. Current interchange 368 also acts as a spring and imparts approximately 12 inch-pounds of torque between hinge 238 and fuse body 230 for assisting hinge member 238 to rotate to its extended position to allow fuseholder 140 to drop out of engagement with upper terminal assembly 146 upon actuation of fusible elements 248, 250. As shown in FIG. 3, pin 414 is disposed through aperture 412 of latch plate 360 and provides support for current interchange 368. Current interchange 368 includes a pair of U-shaped legs 420 separated by slot 422 and connected by segment 424. Legs 420 straddle latch plate 360, and are supported on pin 414. Connecting segment 424 electrically engages bottom end cap 286 while ends 426 of legs 420 electrically engage the ends 366 of legs 364 of hinge member 238.

Fuseholder 140 is shown in FIGS. 2 and 3 with hinge member 238 and connective member 322 in their contracted and charged position, and with latch 380 and latch plate 360 latched. So latched, fuseholder 140 is in its extended position and current is conducted from upper fuse terminal 146 of terminal bushing assembly 10 through fuseholder 140 to mounting spring arms 222 of lower support member 144 by means of bottom end cap 286, current interchange 368 and hinge member 238.

When current limiting fuseholder 140 experiences an overcurrent of a predetermined magnitude and duration, fusible elements 248, 250 will fuse open. For an instant after this occurs, the overcurrent is conducted through fuseholder 140 to bottom end cap 286 via auxiliary wire 262, trigger wire 278, spark gap 318 and conducting washer 294. Trigger wire 278 has a high resistance, and the high $I^2R$ heating, coupled with the heat generated by the arc across gap 318 will sever trigger wire 278, thereby acting as a release means for releasing and freeing latch 380 from retainment by trigger wire 278 and bobbin 394. When this occurs, fuse restraining end 384 of latch 380, no longer held in contact with bottom end cap 286, is biased away from end cap 386 by spring 388. The weight of fuseholder 140 and the forces imparted thereon by upper fuse terminal 146 and the spring force from current interchange 368 will cause the lower cap and hinge assembly 234 to begin to collapse about pin 320 to an extended position, and cause the upper cap assembly 232 of fuse body 230 to drop out of engagement with upper fuse terminal 146. When this occurs, fuse body 230 and lower cap and hinge assembly 234 will begin to rotate about trunion 346 in a clockwise direction as viewed in FIG. 3 until the fuseholder 140 reaches the dropout position and comes to rest on hanger arms 204 of lower fuse terminal 148.

The dropout position that results provides a clear and highly visible indication to linemen that the fuse has operated. Additionally, by causing the fuseholder 140 to drop out of engagement with upper fuse terminal 146 upon the occurrence of an overcurrent, voltage stress is thus removed from the actuated fuse. This voltage stress could otherwise eventually lead to tracking along the outer surface of the fuseholder 140, and possible ultimate flashover between the upper fuse terminal 146 and lower support member 144 of terminal bushing assembly 10.

From the description above, it is readily seen that two separate current paths exist through portions of bushing body 20. As best shown in FIG. 2, during normal, steady-state operation, a first current path exists through fuseholder 140 and bushing stud 56 into transformer 9. Current is conducted to fuseholder 140 via terminal 66, conducting strap 150 and cup electrode 152. The current conducted through fuseholder 140 continues through lower cap and hinge assembly 234 of fuseholder 140 and spring 208 of lower support member 144. The remainder of this first current path includes bolt 210 in lower support member 144, terminal 60, and bushing stud 56, both of which are positioned within bushing body 20. As is apparent, this current path bypasses the surge arrester elements 78 and bypasses the upper portion 22 of bushing body 20.

Referring still to FIG. 2, surge arrester 70 is connected in parallel with the series circuit comprising fuseholder 140 and transformer winding 6. In the event that the transformer winding 6 and surge arrester 70 experience an overvoltage condition, such as for example due to a lightening strike or switching surge, the voltage across the transformer winding and across the surge arrester will rise. As this occurs, the resistance of each MOV 80 decreases. When the voltage appearing across each MOV 80 reaches the element's breakdown voltage, the MOV impedance dramatically decreases, and the MOV become relatively conductive so as to conduct the resulting transient surge current to ground. As the transient overvoltage decreases, the MOV's impedance once again increases to a very high value, ultimately reducing the current through the MOV to a negligible flow and thereby restoring the arrester 70 and system to their normal, steady-state condition. During transient overvoltage conditions, a second current path thus exists through bushing body 20, that second path being defined by terminal 66, stud 98, plate 94, shunt conductor 88, plate 84, MOV column 82, conductive insert 110, stud 114 and arrester isolator 120. The surge current is then conducted to ground via conductor 14 which is interconnected with stud 118 by ground lead connector 16.

As apparent to those skilled in the art, the present invention permits electrical equipment to be manufactured, shipped and installed with overvoltage and overcurrent protective components integrally formed as a part of terminal bushing assembly 10. Terminal bushing assembly 10 thus eliminates the time consuming and burdensome task of interconnecting the various components with discrete conductors strung from element to element. Further, the bushing assembly 10 permits surge arresters and fuses to be located in close proximity to the protected equipment for better protection, and eliminates the possibility of the surge arresters causing partial or total fuse actuation during a temporary overvoltage condition.

While the preferred embodiment of the invention has been shown and described, modifications thereof can be made by one skilled in the art without departing from the spirit and teachings of the invention. The embodiment described herein is exemplary only, and is not limiting. Many variations and modifications of the invention and apparatus disclosed herein are possible and are within the scope of the invention. Accordingly, the scope of protection is not limited by the description set out above, but is only limited by the claims which follow, that scope including all equivalents of the subject matter of the claims.

What is claimed is:

1. A bushing for interconnecting electrical apparatus to a line-potential electrical conductor, the bushing comprising:

an insulative body;

a bushing stud for electrical interconnection with the electrical apparatus, said bushing stud including a first portion retained in said insulative body and a second portion outside said insulative body;

a first terminal on said insulative body for electrical interconnection with the line-potential conductor;

a pair of spaced-apart support members attached to said insulative body;

a fuseholder disposed between said pair of support members;

a first current path through said insulative body, said first path comprising said first terminal, said fuseholder, and said bushing stud;

a nonlinear resistor in said insulative body; and a second current; path through said insulative body, said second current path comprising said first terminal and said nonlinear resistor.

2. The bushing of claim 1 wherein said fuseholder comprises a current limiting fuse.

3. The bushing of claim 2 wherein said fuseholder comprises a dropout fuseholder.

4. The bushing of claim 3 wherein said fuseholder comprises:

a fuse body;

an upper and a lower contact assembly disposed on said fuse body;

a high current fusible element and a low current fusible element housed within said fuse body and connected electrically in series inside said fuse body forming a series combination, said series combination being interconnected between said upper and lower contact assemblies.

5. The bushing of claim 1 wherein each of said support members includes a terminal, and wherein said fuseholder includes series-connected high current and low current fusible elements forming a conductive path between said terminals.

6. A bushing for interconnecting electrical apparatus to an electrical conductor, comprising:

an insulative bushing body having an internal chamber and first and second ends;

a conducting stud having a first portion retained in said internal chamber and a second portion extending outside of said bushing body at said second end, said second portion of said stud adapted for interconnection to the electrical apparatus;

first terminal on said first end of said bushing body for connection to the electrical conductor;

a plurality of nonlinear resistors retained in said bushing body;

a conducting member electrically in series with said nonlinear resistors, a portion of said conducting member extending outside of said bushing body;

a support member connected to said bushing body;

a first conductive path through said bushing body, said first conductive path comprising said conducting stud and a fuseholder supported by said support member; and a second conductive path through said bushing body, said second conductive path comprising said terminal, said nonlinear resistors and said conducting member.

7. The bushing of claim 6 wherein said fuseholder comprises a current limiting fuse.

8. The bushing of claim 7 wherein said fuseholder comprises a dropout style fuseholder.

9. The bushing of claim 7 wherein said current limiting fuse comprises:

an insulative fuse tube;

an upper and a lower contact assembly disposed on said fuse tube;

a high current fusible element and a low current fusible element disposed in said fuse tube and connected electrically in series between said upper and lower contact assemblies.

10. A terminal bushing assembly comprising:

an insulative body having an udder, central and a lower portion;

an upper longitudinal bore formed in said upper portion of said body;

a lower longitudinal bore formed in said lower portion of said body;

a first radial bore formed in said body, said first radial bore intersecting said upper longitudinal bore;

a second radial bore formed in said body, said second radial bore intersecting said lower longitudinal bore;

a conducting stud retained in said lower longitudinal bore, said conducting stud having an extending portion extending outside of said insulative body;

a line terminal on said upper portion of said insulative body;

a conducting member retained in said upper radial bore, said conducting member having an extending portion extending outside of said insulative body;

a plurality of surge arresting elements disposed in said upper longitudinal bore;

means for electrically interconnecting said conducting member and said surge arresting elements; and means for electrically interconnecting said surge arresting elements and said line terminal.

11. The terminal bushing of claim 10 further comprising a seal disposed between said conducting member and said insulative body.

12. The terminal bushing of claim 11 wherein said seal includes a bore for receiving said conducting member and a frustoconical nose portion disposed in said upper radial bore of said insulative body.

13. The terminal bushing of claim 12 further comprising:

an insulator having a central bore disposed about said extending portion of said conducting member; and an arrester isolator disposed about said extending portion of said conducting member.

14. The terminal bushing of claim 10 wherein said means for electrically interconnecting said conducting member and said surge arresting elements comprises a conductive terminal block disposed in said upper longitudinal bore of said insulative body, said terminal block including a bore coaxially aligned with said upper radial bore of said insulative body for receiving said conducting member.

15. A terminal bushing assembly comprising:

an insulative body having an upper, central and a lower portion;

an upper longitudinal bore formed in said upper portion of said body;

a lower longitudinal bore formed in said lower portion of said body;

a first radial bore formed in said body, said first radial bore intersecting said upper longitudinal bore;

a second radial bore formed in said body, said second radial bore intersecting said lower longitudinal bore; a conducting stud retained in said lower longitudinal bore, said conducting stud having an extending portion extending outside of said insulative body;

a line terminal on said upper portion of said insulative body;

an upper fuse support having a first end attached to said insulative body and having a second end spaced-apart from said first end;

an upper terminal assembly on said second end of said upper fuse support;

means for electrically interconnecting said upper terminal assembly and said line terminal so as to form a conductive path therebetween;

a lower fuse support having a first end attached to said insulative body and a second end spaced-apart from said first end;

a lower terminal assembly on said second end of said lower fuse support;

means for electrically interconnecting said lower terminal assembly and said conducting stud so as to form a conductive path therebetween;

said means for electrically interconnecting said lower terminal assembly and said conducting stud comprising:

- a conductive terminal block disposed in said lower longitudinal bore of said insulative body, said terminal block including a receiving bore coaxially aligned with said lower radial bore of said insulative body;
- an insulator having a central bore coaxially aligned with said receiving bore of said terminal block;
- a mounting hinge having an aperture aligned with said receiving bore of said terminal block; and
- a fastener having a conductive shank disposed through said aperture in said mounting hinge and through said bore in said insulator and retained in said receiving bore of said terminal block.

16. A transformer comprising:

an enclosure;

a transformer winding retained in said enclosure;

a bushing body attached to said enclosure;

a bushing stud electrically interconnected with said winding and disposed through said enclosure and extending into said bushing body;

a line terminal on said bushing body for connection to a line potential conductor;

at least one nonlinear resistor retained in said bushing body;

a fuseholder supported from said bushing body;

a first current path from said line terminal through said fuseholder and through said bushing stud; and a second current path from said line terminal through said nonlinear resistor.

17. The transformer of claim 16 further comprising:

a conducting stud extending from said bushing body and electrically interconnected with said nonlinear resistor, said stud comprising a portion of said second current path; and an intermediate terminal on said conducting stud for connection to a ground lead.

18. The transformer of claim 17 further comprising:

an upper fuse support having a first end attached to said bushing body and having a second end spaced-apart from said first end;

an upper terminal assembly on said second end of said upper fuse support;

means for electrically interconnecting said upper terminal assembly and said line terminal so as to form a conductive path therebetween a lower fuse support having a first end attached to said bushing body and a second end spaced-apart from said first end;

a lower terminal assembly on said second end of said lower fuse support;

means for electrically interconnecting said lower terminal assembly and said bushing stud so as to form a conductive path therebetween wherein said fuseholder comprises a current limiting fuseholder disposed between said upper and lower fuse supports and engaging said upper and lower terminal assemblies.

* * * * *